US006226787B1

United States Patent
Serra et al.

(12) United States Patent
(10) Patent No.: US 6,226,787 B1
(45) Date of Patent: May 1, 2001

(54) VISUALIZATION METHOD AND SYSTEM FOR DYNAMICALLY DISPLAYING OPERATIONS OF A PROGRAM

(75) Inventors: Bill Serra, Palo Alto; Antoni N. Drudis, Saratoga, both of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/236,495

(22) Filed: Jan. 25, 1999

(51) Int. Cl.$^7$ .................................................. G06F 9/45
(52) U.S. Cl. ...................................... 717/4; 717/1; 717/11
(58) Field of Search ........................... 717/4, 1, 11, 37.45; 345/133

(56) References Cited

U.S. PATENT DOCUMENTS

| | | | |
|---|---|---|---|
| 5,175,856 | * 12/1992 | Van Dyke et al. | 395/700 |
| 5,428,793 | 6/1995 | Odnert et al. | 395/700 |
| 5,987,249 | * 11/1999 | Grossman et al. | 395/704 |
| 6,016,474 | * 1/2000 | Kim et al. | 705/1 |
| 6,026,362 | * 2/2000 | Kim et al. | 705/1 |
| 6,085,029 | * 7/2000 | Kolawa et al. | 395/183.14 |

OTHER PUBLICATIONS

Dow et al. A Visualizations System for Paralleizing Program. IEEE. pp. 194–203, May, 1992.*
Gibbs et al. A Multimedia Component Kit. ACM. pp. 291–300, Aug. 1993.*

* cited by examiner

Primary Examiner—Kakali Chaki
Assistant Examiner—Wei Zhen

(57) ABSTRACT

A method and system of identifying operations of one or more computer programs include generating a representation of the programs as a visual display of graphs and manipulating the visual display while the program is executed. The manipulation of the display provides a visual indication of threads of execution of the events. In one selectable implementation, the threads of execution are indicated by forming traces that link nodes of a graph, where the nodes are representative of the sequentially occurring events. The dynamic visualization at run-time may be enabled by augmenting the source code of the computer program with stubs that uniquely identify blocks and lines of source code. Each executable event within the program may be uniquely associated with a stub that forms a message to a run-time visualizer as the executable event is triggered during run-time. The dynamic visualization may be set in a speed-controllable continuous execution mode or in a step-by-step execution mode. Optionally, the user can collapse, or cause to disappear, selected portions of the graph of nodes, thereby reducing the processing overhead imposed by the system. The user may also set a breakpoint at a particular node, so that the program stops when the execution path of a thread reaches the breakpoint. A user may associate one or more nodes with the launching of an external application, thereby augmenting the functionality of an existing program or programs at run-time, without requiring recompilation of the programs. Static visualization is also enabled.

22 Claims, 13 Drawing Sheets

```
public class StockTracker [extends: Applet]
void paintOffScreenImage (Graphics graphics)
{
Date now - new Date ();
if (stockPricePreviousValue == null)
    {
    stockPricePreviousValue = new int [canvasWidth];
    stockPricePreviousTick = new Date [canvasWidth];
    incrPrevious = new int [canvasWidth];
    decrPrevious = new int [canvasWidth];
    stockPriceIndex = 0;
    stockPricePreviousTick [0] = now;
    stockPricePreviousValue [stockPriceIndex++] = stockPrice;
    } stockPriceTextField.setText (stockPrice="");
sellButton.setBackground(Color.white);
buyButton.setBackground(Color.white);
if (stockPrice < thresholdMin) buyButton.setBackground (Color.red);
else if (stockPrice > thresholdMax) sellButton.setBackground(Color.red);
if (stockPriceIndex >= canvasWidth)
    {
    for (int i = 1; i < canvasWidth; i++)
        {
        stockPricePreviousValue[i-1] = stockPricePreviousValue [i];
        stockPricePreviousTick[i-1] = stockPricePreviousTick [1];
        incrPrevious [i-1] = incrPrevious [1];
        decrPrevious[i-1] = decrPrevious [i];
        }
    stockPriceIndex = canvasWidth - 1;
    } stockPricePreviousTick[stockPriceIndex] = now;
decrPrevious [stockPriceIndex] = decrHold;
incrPrevious [stockPriceIndex] = incrHold;
incrHold = decrHold = 0;
stockPricePreviousValue [stockPriceIndex++] = stockPrice;

graphics.setColor(Color.white);
graphics.fillRect(0, 0, canvasWidth, canvasHeight);
graphics.setColor(Color.pink);
graphics.setFont(smallFont);
for (int x = 0; x < canvasWidth; x += 10)
if (x % 50 -- 0)
```

```
}
source:C:\bills\softscope\examples\StockTracker.java lines:243-343
    ─────□ new Date ( )
    ─────□ TextField.setText ( )
    ─────□ Button.setBackground ( ) +3
    ─────□ Graphics.setColor ( ) +8
    ─────□ Graphics.fillRect ( )
    ─────□ Graphics.setFont ( )
    ─────□ Graphics.drawString ( ) +1
    ─────□ FontMetrics.getHeight ( )
    ─────□ Graphics.drawLine ( ) +4
    ─────□ SimpleDateFormat.format ( )
    ─────□ Graphics.drawRect ( )
called from StockTracker.run ( )
```

FIG. 3

```
emacs@PACIFIC                                          — ☐ ✕
Buffers   Files   Tools   Edit   Search   Java   Help
                                     94
   void updateSharesHeld (int shares) { ■

// shares can be positive (buying) or negative (selling).
      // check that there is enough cash (buying), or enough shares to
      // sell (selling).  Don't do anything otherwise.
                                         96
      synchronized (stockPriceTextField) { ■
                 98
         ■  try { ■

■  int stockPrice + Integer.parseInt(stockPriceTextField.getTest()));

■  boolean buying = shares > 0;

■  boolean selling = !buying;

■  if (buying && stockPrice > cash) return;

■  if (selling && sharesHeld <=0) return;

■  sharesHeld += shares;

■  cash -= shares * stockPrice;

■  int sharesValue = sharesHeld * stockPrice;

■  sharesHeldTextField.setText(sharesHeld+"");

■  sharesValueTextField.setText(sharesValue+"");

■  cashTextField.setText (cash+"");           100
     102                                                 
  116                  } ■  catch (NumberFormatException e) { ■  System.err.println(e) ; ■ }
                                                                                      104
108            }

}

---- Emacs: StockTracker.java     (T:Java Font) -- L348 -- 81% ----------------
```

FIG. 7

VISUALIZATION METHOD AND SYSTEM FOR DYNAMICALLY DISPLAYING OPERATIONS OF A PROGRAM

TECHNICAL FIELD

The invention relates generally to methods and systems for identifying operations of a computer program and more particularly to providing detailed visualization of the run-time behavior of a computer program.

BACKGROUND ART

As the complexity of computer programs continues to increase, the benefits of software development tools are amplified. The interactions among operations within a computer program are not apparent to a developer during execution of the program. Typically, when a program stops crashing during testing, it is assumed that the program will run as expected. However, the level of confidence is typically not high, since a program cannot be tested in all possible environments in which the program may be run. For example, conflicts may occur as a result of the loading of two unrelated programs onto a computer system.

One available software development tool is referred to as a compiler. A compiler is a program that converts another program written in a high-level language into machine code or assembly language. A compiler is described in U.S. Pat. No. 5,428,793 to Odnert et al., which is assigned to the assignee of the present invention. The compiler of Odnert et al. is designed to produce a separate summary file for each source code file that is introduced to the compiler. A program analyzer then builds a single program call graph from all of the summary files. The graph consists of a set of nodes, each representing a procedure. The nodes are interconnected by directional edges that represent calls from one procedure to another procedure. The program analyzer also identifies "webs," which link classes of definitions and uses of a variable. Thus, a web is a collection of program call graph nodes. An optimizer may then be used to increase the efficiency of the program.

Another development tool is an interpreter. The interpreter is similar to the compiler, but includes an execution step. First, the source code of a computer program of interest is converted into machine code or assembly language. A parser then forms a hierarchy that reflects the program's logic. A type checker may be used to identify programming errors. Finally, the program is executed. For example, the interpreter may identify commands to form a sequence of binary machine instructions that a computer system executes until the program is completed.

Yet another available tool is a debugger. The debugger may be used to monitor software as it is executed. Debuggers typically allow a degree of post-mortem visualization of the state of a malfunctioning program at a breakpoint. Thus, there is a limited portrayal of program execution.

A traditional method used by programmers to reduce the complexity of program design is to "encapsulate" segments of source code in blocks having one point of entry and one or more points of exit. Each block may be considered to be a black box that needs to be considered only if there is a malfunction. The black boxes then become building blocks for complex programs. Programmers may work in teams to manage the complexity of administering growing programs. That is, a complex program may be divided into functional parts in order to minimize the interdependencies among functions and to assign each function to a different individual or group of individuals. This solution is simple and elegant, but in practice it is not always viable. Moreover, minimizing interdependencies among different parts of programs may reduce complexity, but often at a sacrifice of performance. That is, there is typically a tradeoff between complexity and performance.

Program visualization may also be used to manage complexity. As previously noted with respect to the Odnert et al. patent, a software program may be viewed as a graph of interconnected nodes, typically having a hierarchical structure. Each block of code may be identified as one of the nodes of the graph. Consequently, the nodes represent methods, data accesses, and other events. Software is dynamic in nature. During run-time, a "thread" of execution traverses the graph. Each node is a potential fork for the execution thread. The description of the graph of a program is a static expression of the paths that threads take. However, the control of a path of a thread usually depends upon external events, such as data dependencies. As a result, such a graph may include a complex of thread paths, if the graphed program is sophisticated.

What is needed is a method and system for increasing the level of visualization of the internal structure of a program. What is further needed is such a method and system which provide run-time displays of operations of a computer program or programs of interest.

SUMMARY OF THE INVENTION

A method and system for visualizing the structure and operations of a computer program include generating a representation of the program as a visual display of nodes and include manipulating the visual display in real time when the program is executed. In the preferred embodiment, the representation is a graph and the nodes are associated with executable events, such as those of a block of source code. The nodes include methods that are executable during a run-time of the computer program. As the program is run, the visual display of the graph is manipulated to indicate the accessed blocks at run time. In the preferred embodiment, threads of execution are indicated by forming traces that link nodes which are representative of the sequentially occurring events.

In a compiler mode, the system and method parse instructions written in computer language, check for syntactic and semantic errors, and build an internal representation of the program. Also in this compiler mode, the system and method either augment the source code with stubs that enable communication with a run-time visualizer or generate a second version of the source code that is suitable for reading by an engine that provides static visualization.

In a run-time mode, the system and method display the state of the execution of the program by indicating active threads and active nodes of the graph. In the embodiment in which the compiler mode includes forming stubs to augment the source code, the stubs uniquely identify the state of the program. For example, each executable event within the program may be uniquely associated with a stub that forms a message to the run-time visualizer, so that a line in a program may simultaneously trigger an operation by a central processing unit (CPU) and trigger transmission of a message to the run-time visualizer. As the messages are received, the visualizer updates the display of active execution threads and active nodes.

The updates of the execution threads visually display each subsequent event that logically follows a preceding event in the execution of the computer program. As previously noted, this may be achieved by forming a trace from a first node that is associated with the preceding event to a second node associated with the subsequent event. The traces are visually displayed on a computer monitor or the equivalent until the execution thread is no longer active. However, the system and method preferably enable a user to select between (a) limiting display of execution threads to active threads and (b) maintaining displays of execution threads following completions of executions of logical sequences represented by the threads. Also in the preferred embodiment, the system and method enable a tracking mode that includes recording each event that is executed within a specified time period. This recording capability supports playback, rewind and fast forward direct access to any recorded event. In the most preferred embodiment, the event recorder shows a textual representation of the events, as well as a two-dimensional graph which is identical to the graph used in the original run-time execution.

The system and method preferably include other features that facilitate perception of the interdependencies of the computer program by establishing an interactive relationship between the system and the computer program. The visualizer is not merely a static receiver of events, since it is configured to generate events that affect the behavior of the execution of the program. Preferably, the user is enabled to control the speed of execution of the program within a wide range of speeds that include a step-by-step execution at the low end of the range. A scroll bar may be manipulated to dictate the speed when the user changes from the step-by-step execution to a continuous execution. Portions of the graph may be selectively removed, thereby reducing overhead and increasing the speed of the execution. Thus, the user may collapse all portions of the graph beyond that portion of interest to the user. Also in the preferred embodiment, users may set a breakpoint at a particular node. When the execution path of a thread reaches the breakpoint, execution of the program stops until the user indicates that the execution is to continue.

Visualization is not restricted to a single run. A number of programs or a number of runs of the same program or different programs can be shown simultaneously. The system and method administer a unique name space for all the nodes in order to avoid name collisions.

In addition to the dynamic visualization described above, there is preferably a static visualization that is generated. The structure of the computer program is displayed by identifying related blocks of source code and generating a representation that encloses the blocks within a frame. The blocks may include methods, may contain other blocks, and may reference methods. This is all evidenced within the representation. If a block is a loop (i.e., a "for," "do," or "while" cycle), the frame that is associated with the block may include a mark that is indicative of a loop. For example, an arrow along the frame may be used to indicate that the block is a loop. The size and placement of an outline within a page depends upon the size of the page, the size of the font, and the predetermined layout. Pages may have any width and height, but each method is printed on a single page, regardless of the size of the page. This allows printouts to be sent to either small or large format printers. Preferably, at the end of each method, a call reference graph is shown, as well as a list of called-from methods. That is, each method shows the possible paths a thread can take upon executing the particular method, and also shows potential routes from which the thread may come. As another assist in visualizing the structure in a program, a linear graph and a circular graph may be used to display the nodes and the interdependencies of the nodes.

BRIEF DESCRIPTION OF THE DRAWINGS

FIG. 3 is a PostScript representation of blocks of code generated using the system of FIG. 1.

FIG. 7 is an exemplary illustration of source code instrumentation to enable dynamic display of operations of the program, using the system of FIG. 1.

DETAILED DESCRIPTION

Figure 1:
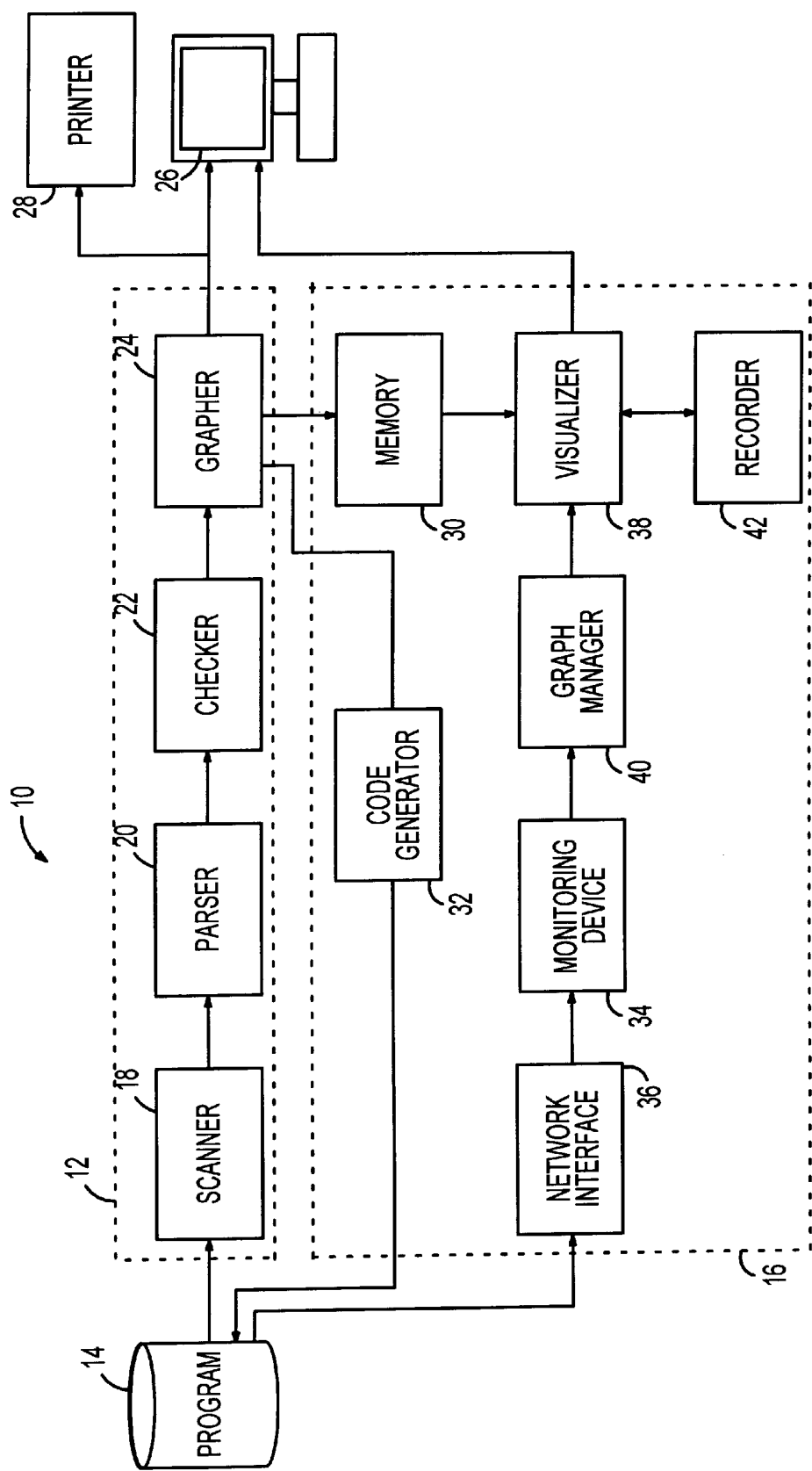
FIG. 1 is a block diagram of a visualization system for statically and dynamically displaying operations of a program.

With reference to FIG. 1, a visualization system 10 includes a first group of functionally related components 12 for enabling static visualization of the operations of a program 14 and includes a second group of functionally related components 16 for enabling dynamic visualization. The first group of components 12 is used when the system is in a compiler mode, while the second group 16 is used when the system is in a run-time mode. As will be explained more fully below when referring to FIGS. 3–6, the static visualization provides a blueprint of the computer program 14. Blocks of code are enclosed within a frame and any block that is a cycle includes a cycle designation, such as an arrow on the frame of that block. The static visualization preferably also includes linear and circular call graphs that identify nodes and the interdependencies among the nodes. As will also be described below when referring to FIGS. 7 and 8, the dynamic visualization includes forming a representation of the program and manipulating a visual display of the representation to illustrate execution threads in run-time. Preferably, the representation is a graph of the program and the execution threads are displayed as traces that link sequential events in the execution of the program.

The operations of a scanner 18, a parser 20 and a checker 22 are utilized to provide compilations and are known in the art. A scanner converts source code of the program 14 into symbols that can be arranged in a hierarchy that reflects the logic of the program. The checker then determines whether errors exist. The output of the checker is directed to a grapher 24 that is used to form the static visualizations. Thus, the components of the first group 12 parse instructions written in a computer language, check for syntactic and semantic errors, and build internal representations of the computer program 14. The representations may be displayed using a monitor 26 or may be printed using a printer 28. The representations are stored in memory 30.

Regarding the group of components 16 that provide dynamic visualization, a code generator 32 is connected to the first group of components 12. While the code generator is shown as being connected directly to the grapher 24, the connection may be made upstream of the grapher operations. For example, the code generator may be connected to the checker 22. In the preferred embodiment, the code generator provides code instrumentation that is detected by a monitoring device 34 during execution of the computer program 14. Stubs may be formed to augment the source code of the program 14, so that the monitoring device 34 detects each time that a stub is encountered during the run-time of the program. The stubs may be encoded to uniquely identify each node of a graph that is visually displayed during execution of the program. The device monitor is connected to a network interface 36. The interface links the group of components 16 to hardware for running the program and providing inputs to the program. In another embodiment, a PostScript version of the source code is generated and the printer 28 is a PostScript engine that is able to interpret the source code, thereby enabling the visualization system 10 to track operations of the program in run-time.

During the execution of the computer program 14, a visualizer 38 accesses a run-time representation (e.g., a graph) from memory 30 and displays the representation on the monitor 26. The visualizer 38 receives information from the monitoring device 34. Thus, the visualizer is updated in real time with the state of execution of the computer program. The visualizer manipulates the run-time visualization to indicate the execution threads. As previously noted, an execution thread may be displayed as a number of traces that link nodes to display sequences of events.

The second group of components 16 also includes a graph manager 40 and a recorder 42. The graph manager is used to enhance the visualization of program execution. Selected regions of a graph may be shown or hidden. Thus, nodes of the graph may be caused to collapse. Subgraphs can be removed and restored from the screen, partially or entirely, at the request of the user. When subgraphs are invisible, events related to that subgraph are not identified to the visualizer 38, thereby reducing overhead and increasing the speed of program execution. The graph manager 40 may also be used to set breakpoints at any node of the graph. When an execution thread reaches a breakpoint, execution of a program stops until the user commands the program to continue. As another feature, the graph manager may be controlled to determine the speed of execution of the program. The range of speed variation may be from zero steps per second to full speed. The rate of execution at full speed depends upon the underlying hardware. Users may select a step-by-step execution or a continuous execution at a specified speed.

The graph manager 40 is capable of associating certain nodes with external applications, thereby enabling the cooperation of independent programs without recompiling the programs. For example, when a thread of a running program reaches a particular node, a second program may be automatically initialized. That is, the launching of programs may be conditional to the simultaneous states of independent programs, without requiring reprogramming of the existing programs. A program that is time sensitive with respect to executing events at certain times during a day can be enabled with the enhanced functionality of conditioning the execution of the events upon the day of the week, if the program is linked to an independent calendar program. The system of FIG. 1 may be used to visualize the interrelationship between the programs without requiring the programs to be stopped for recompiling.

The recorder 42 is used to support playback, rewind and fast forward direct access to sequences of events. Thus, an execution thread or a portion of a thread may be recorded and then replayed to enable better understanding of the sequence of events. The event recorder preferably presents a textual representation of the events, as well as a two-dimensional graph which is identical to the graph from which it was originated. The visualizer 38 and the monitor 26 are used for this purpose. The capability provides visualization of the state of monitors and semaphores to show thread blocking and deadlocks.

Figure 2:
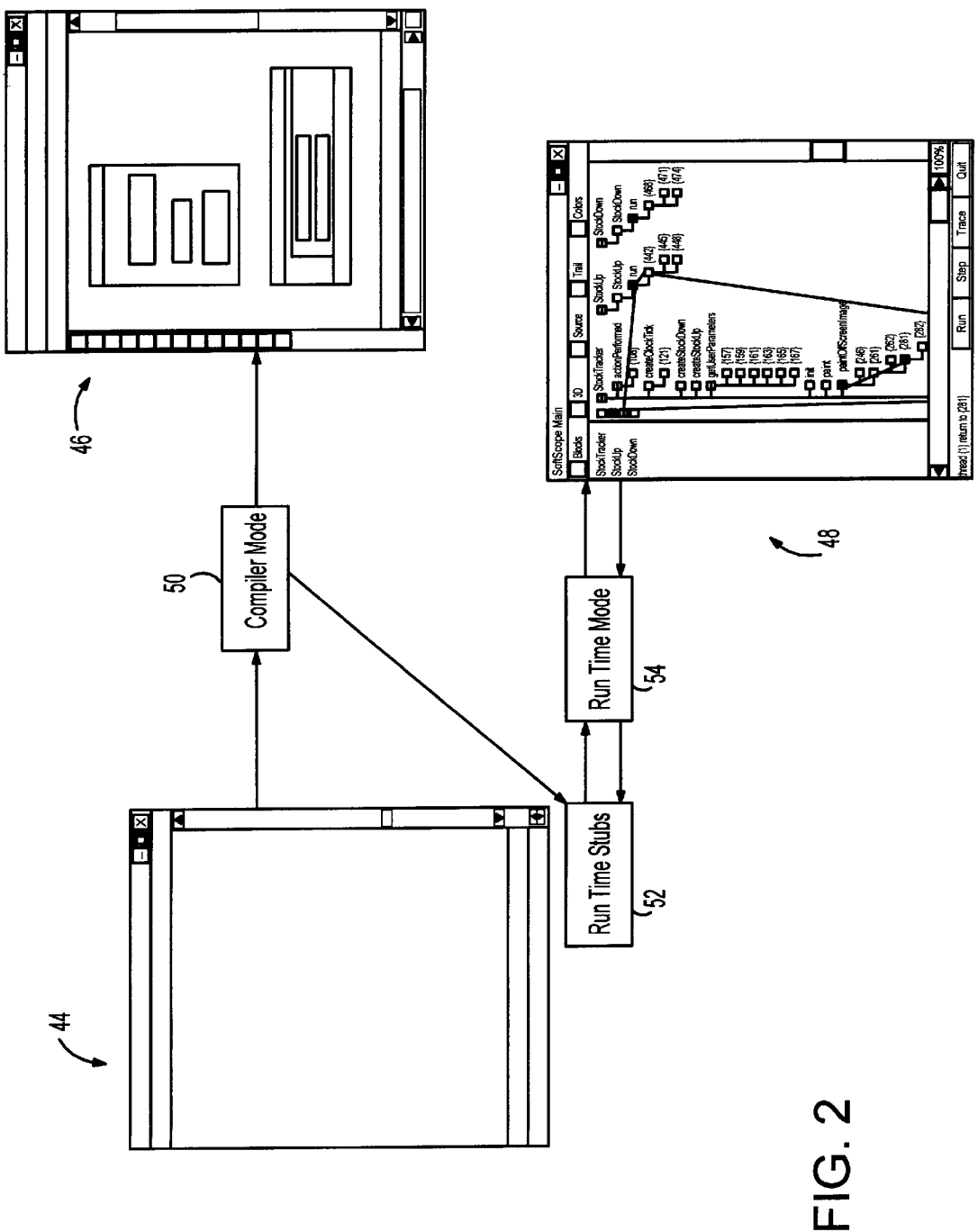
FIG. 2 is a schematic representation of two modes of operation of the system of FIG. 1.

FIG. 2 is a schematic representation of the two modes of operation of the system 10 of FIG. 1. Three screen windows 44, 46 and 48 are illustrated. Each display window represents a different format of the computer program that is of concern to the user. While the text is not shown in FIG. 2, window 44 represents the program in a text-only format. For example, the source code may be visible to a user via the first screen window 44. It is typically a time-intensive process to determine the operations of a complex program using the text-only format, even when the source code or other text is printed. However, the compiler mode 50 of FIG. 2 utilizes the first group of components 12 of FIG. 1 to form a "blueprint" of the computer program 14 at the second screen window 46. The blueprint will be described more fully below with reference to FIGS. 3–5. The blueprint provides a static visualization of the program.

A dynamic visualization of the computer program 14 is displayed at the third screen window 48 using the second group of components 16 of FIG. 1. Run-time stubs 52 are formed using the code generator 32. The run-time mode 54 of operation accesses a previously formed graph of nodes from the memory 30 and forms traces between nodes to indicate active threads of execution in real time. The dynamic visualization will be described in greater detail below with reference to FIGS. 7 and 8.

FIG. 3 shows one static representation of the program. As is known in the art, a program includes blocks, which are segments of logically related source code. Some blocks have a name (method). Blocks may contain other blocks and may reference methods. In an object-oriented program, methods may be contained in classes and classes may be contained in packages. The program that was used to form the printout of FIG. 3 is an exemplary program referred to as "Stock-Tracker." The program is not critical to the present invention. The first three blocks in the printout are enclosed in frames 56, 58 and 60. The block 60 is contained within block 58. Consequently, the containment hierarchy is clearly shown by the printout.

A block that is a cycle (such as a "for," "do," or "while" cycle) includes at least one loop designator, which may be shown as arrows 62 and 64 on frame 60. The size and the placement of a frame within a printout depend on the size of the page, the size of the font, and the layout that is selected by a user. Pages can have an arbitrary width and height. However, methods are always printed in the same page, regardless of the size of the page. This allows printouts to be sent to either small or large format printers. This is particularly useful when large segments of a computer program are to be visualized.

The printout of FIG. 3 includes a method header 66 to identify the code that is visualized. The printout also includes method outlines, such as the ones indicated by reference numerals 68 and 70. While not shown in FIG. 3, external and internal calls are preferably shown in different colors or are otherwise distinguishable. Toward the bottom of the printout, there is an identifier 72 of the source file and the location of the visualized program segment within the source file. Finally, there is a call reference graph 74. The call reference graph identifies the "calls to" and the "called from" methods within the visualized segment of code.

Figure 4:
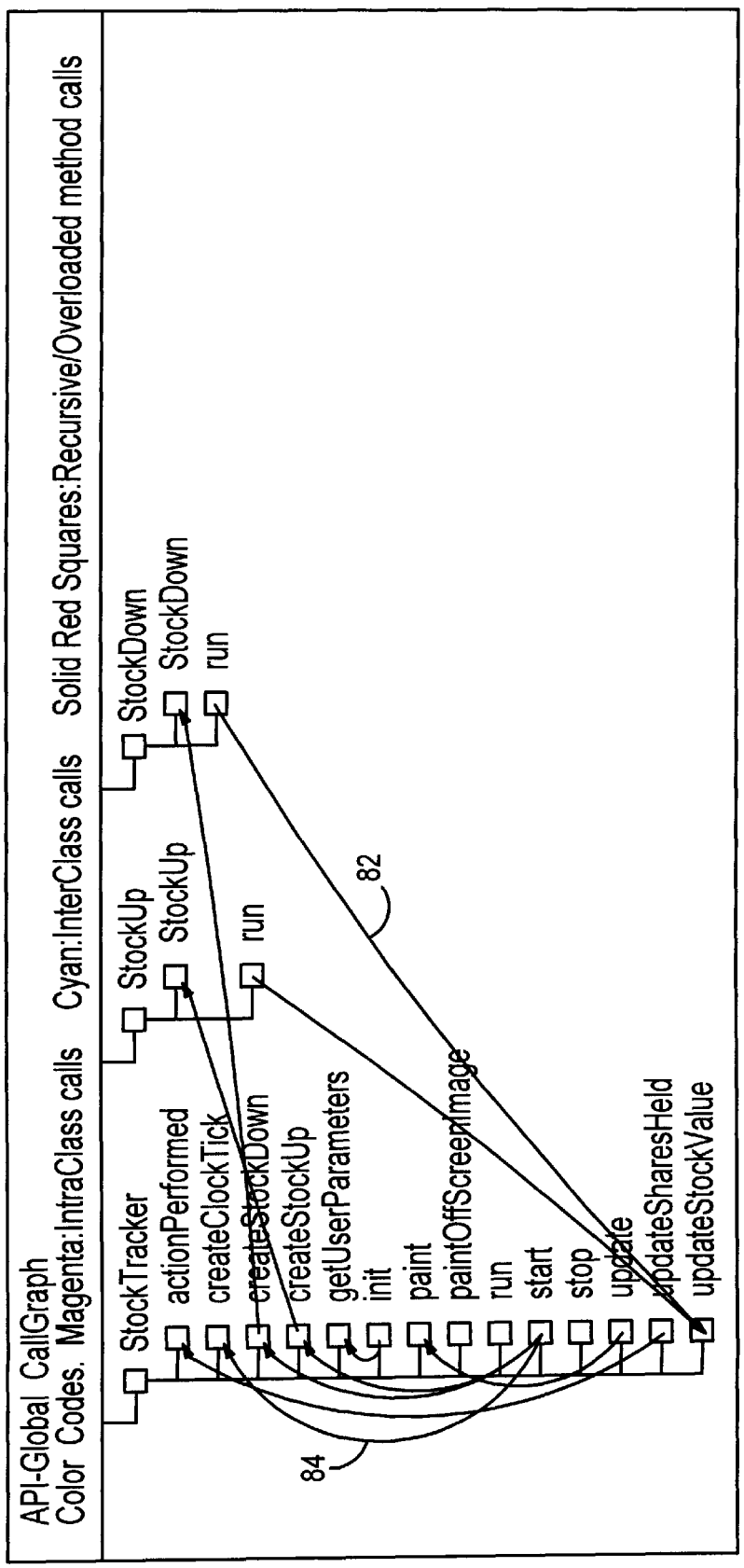
FIG. 4 is a linear call graph that is generated using the system of FIG. 1 to statically display operations of the program.

A global call reference graph is shown in FIG. 4. The call reference graph is generated using the first group of components 12 in the system 10 of FIG. 1. Referring briefly to FIG. 2, the static visualization of the second screen window 46 may include one or more displays 76 and 78 of the printouts described with reference to FIG. 3, but preferably also includes a call reference graph of the type shown in FIG. 4. The call reference graph includes the identification of the classes of the StockTracker that is used as the exemplary program in describing the present invention. In FIG. 3, the three classes are identified as "StockTracker," "StockUp" and "StockDown." The call graph 80 of FIG. 4 also identifies the methods within each class. Within the StockDown class there are two methods, i.e., "StockDown" and "run." By using lines 82 and 84 that include direction arrows, the possible paths that a thread can follow upon execution of the program are shown. For example, when the "createStockDown" method of the "StockTracker" is executed, the "StockDown" method of the "StockDown" class is called. Then, when the "run" method of the "StockDown" class is executed, the "upStockValue" method of the "StockTracker" class is called. While not shown in FIG. 4, the call graph 80 is preferably color coded to distinguish different types of calls, e.g., intra-class calls, inter-class calls, and recursive/overloaded calls.

Figure 5:
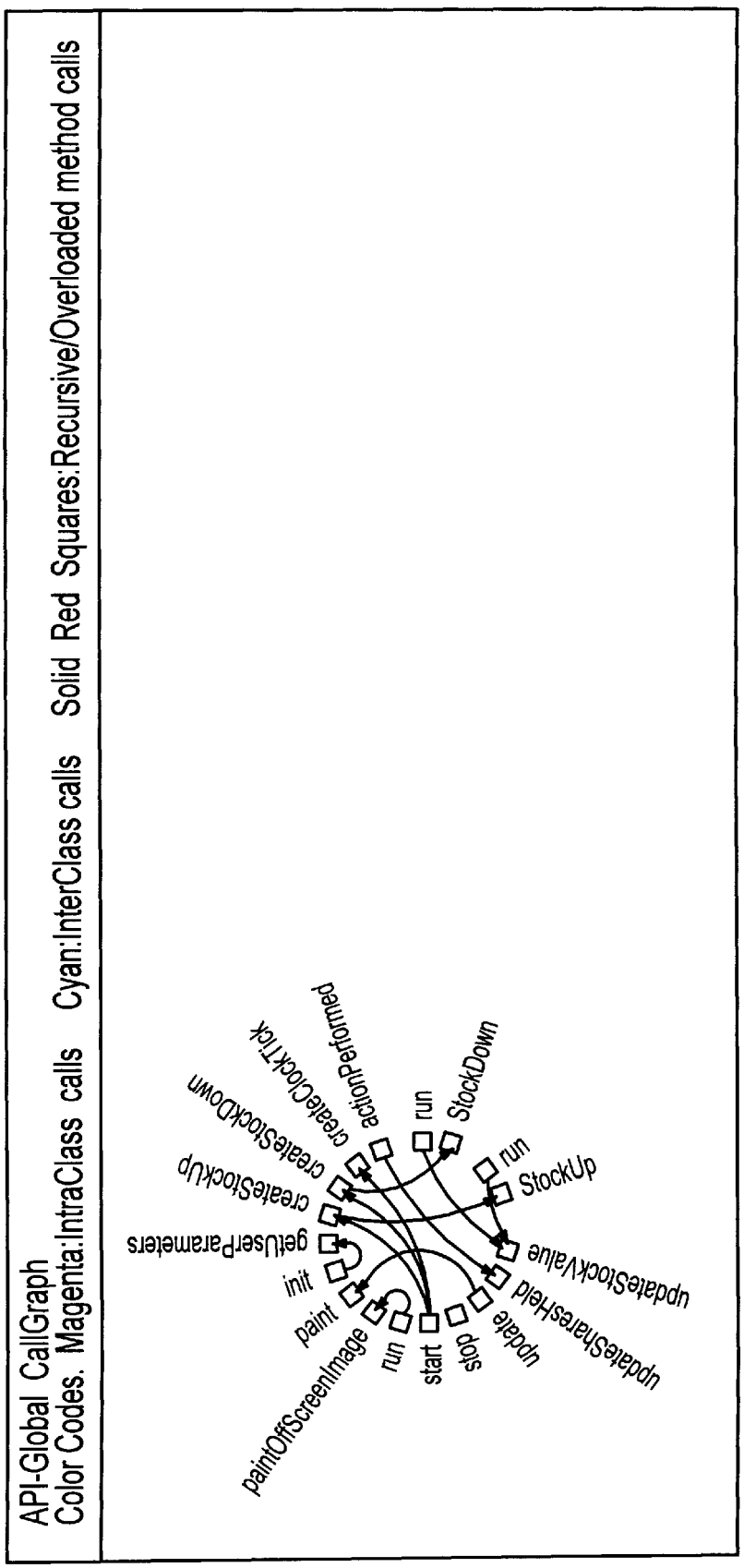
FIG. 5 is a circular call graph that is generated using the system of FIG. 1 to statically display operations of the program.

The global call graph 80 of FIG. 4 is a linear graph. The system of FIG. 1 preferably includes the capability of providing a circular call graph 86 of the type shown in FIG. 5. The circular call graph of FIG. 5 is consistent with the linear call graph of FIG. 4 with respect to indicating possible paths of a thread during execution of a computer program. The call graphs are also consistent with respect to color coding to indicate the different types of calls. While the classes are not shown in FIG. 5, the methods of one class are distinguishable from the methods of another class by the spacing between the methods. Specifically, the methods within a particular class are equidistantly spaced, but are spaced by a greater distance from a method of a different class.

Figure 6:
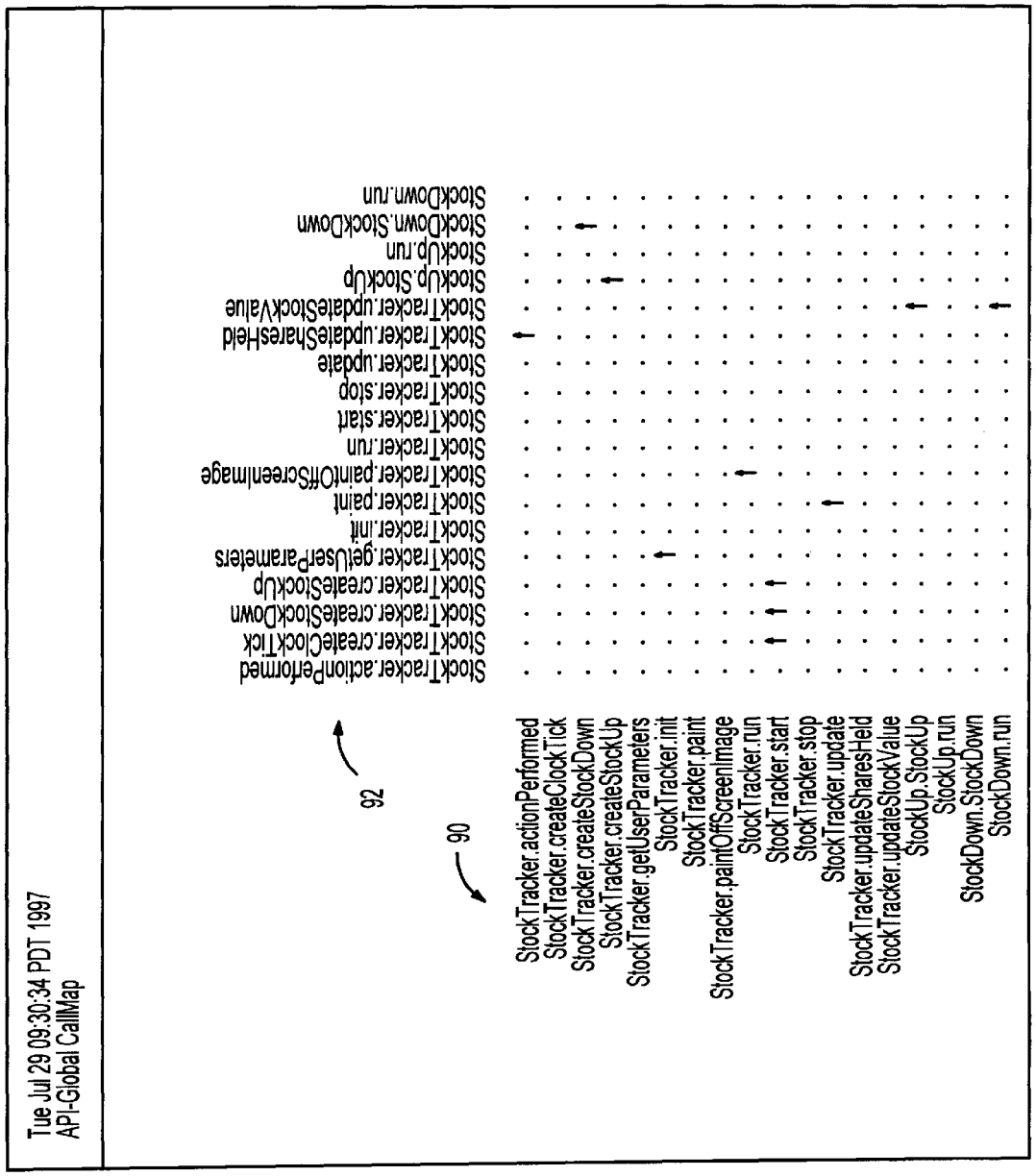
FIG. 6 is a call map that is generated using the system of FIG. 1 to statically display operations of the program.

Referring now to FIG. 6, a global call map 88 is shown. The call map is generated using the first group of components 12 of the system 10 of FIG. 1. Within the call map 88, the different methods are shown in both a vertical list 90 and a horizontal list 92. The lists have identical arrangements. The first portion of each method in a list identifies the class, while the second portion identifies the method. The vertical arrows identify the possible paths of a thread upon execution of the method that is to the left of the vertical arrow. Thus, the vertical arrows indicate the potential routes that thread may take.

Returning to FIGS. 1 and 2, the second group of components 16 of the system 10 operates during the run-time mode 54 to provide the dynamic visualization of program execution within screen window 48. As previously noted, the run-time mode may be enabled by generating a specialized version of the source code, such as a PostScript version that is to be interpreted by a PostScript engine, or by augmenting the source code with stubs that are detected by the monitoring device 34. The monitoring device communicates with the visualizer 38 to identify the state of the computer program 14 in real time. That is, the state of execution of the program is visually identified by traces that traverse the third screen window.

Referring to FIG. 7, a portion of the source code of the StockTracker program is illustrated. Code instrumentation is represented by darkened squares that will be referred to as stubs. In the preferred embodiment, each stub uniquely identifies the specific location within the source code. Four of the stubs 94, 96, 98 and 100 identify the beginning of a block. Stubs 102, 104, 106 and 108 each identify the end of a block. Most of the remaining stubs identify the beginning of a line of code.

The code generator 32 of FIG. 1 is used to generate the stubs 94–108 of FIG. 7. When the program is executed, the encounter of a particular stub generates a message that is detected by the monitoring device 34 and communicated to the visualizer 38. The graph manager 40 may be used to filter the messages or to achieve desired results, such as the ability to collapse portions of the graph that provides the dynamic visualization of execution.

Figure 8:
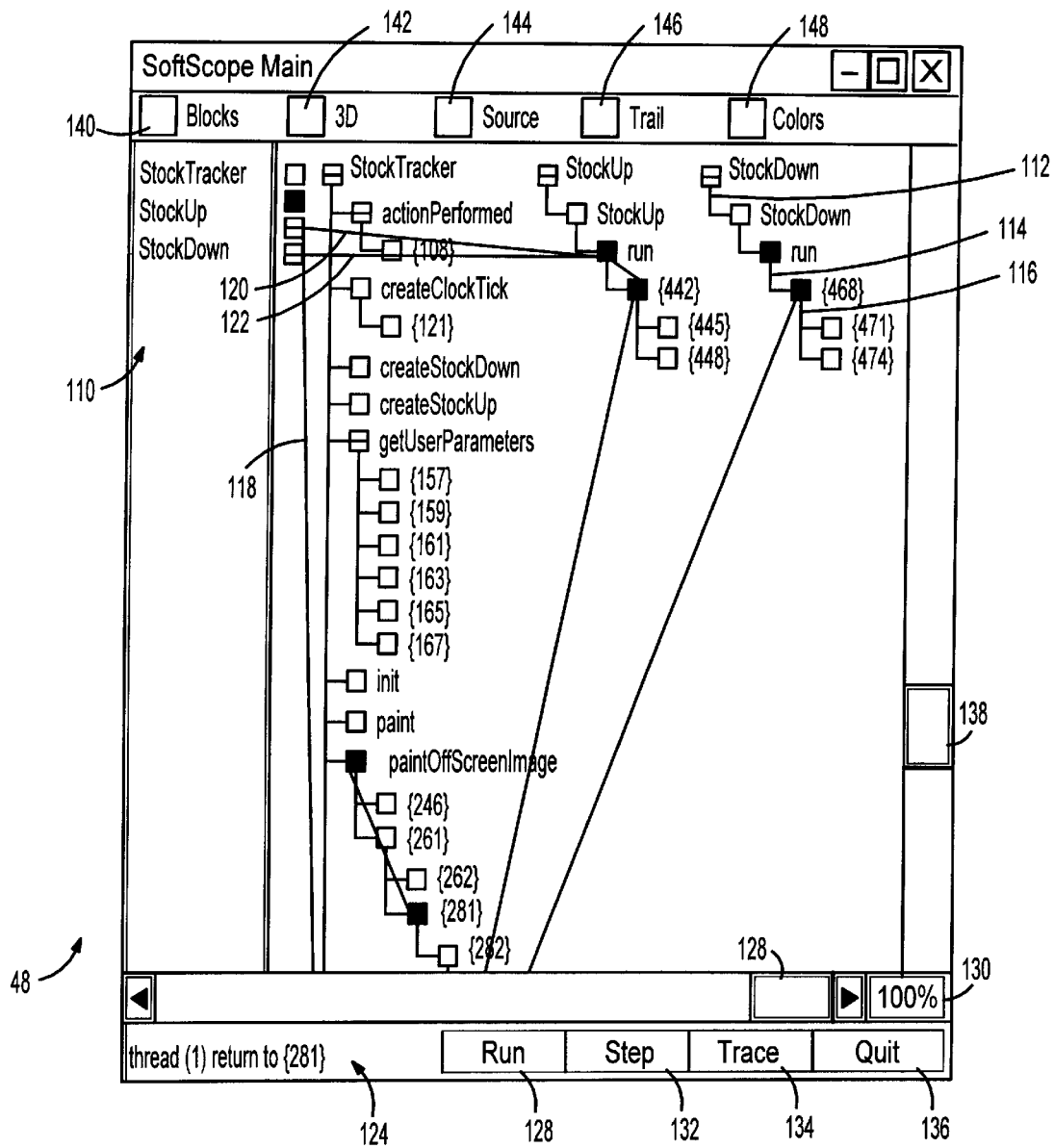
FIG. 8 is an exemplary dynamic display of the operations of the program using the system of FIG. 1.

The third screen window 48 is enlarged in FIG. 8. The three classes of the exemplary StockTracker program are listed in a left-hand column 110 of the screen window. The three classes are also indicated at the upper portion of the display region which is to the right of the column 110. The methods that are associated with a particular one of the three classes are listed below the associated class and are directly linked to a vertical line (i.e., an edge) of the class. For example, the vertical line 112 links the methods "StockDown" and "run" to the class "StockDown." In an identical manner, the blocks are shown in a hierarchical manner by connections to vertical lines. For example, block 468 is associated with the "run" method of StockDown class, as indicated by the vertical line 114, and blocks 471 and 474 are associated with block 468, as indicted by vertical line 116.

As the StockTracker program is run, the state of the execution of the program is indicated by identifying active nodes and by forming traces between sequentially activated nodes. Preferably, the traces are color coded to indicate different active threads. In FIG. 8, there are three active threads. The first trace of one active thread is designated as trace 118. The first trace of the second active thread is designated as trace 120, while the first trace of the third thread is designated as trace 122. In the preferred embodiment, each trace of a thread remains visible during the term that the execution thread is active. As shown in FIG. 8, the activated nodes are also identified, using a "fill" of the square associated with the activated node.

A thread event of significance may be continuously updated at a lower left corner of the dynamic display. In FIG. 8, the event is identified as a return of the first thread to block 281, as indicated by reference numeral 124. Adjacent to the thread indicator 124 are four screen "buttons." By locating a cursor over the "RUN" button 126 and depressing a mouse button, not shown, the computer program may be placed in a continuous mode of execution. The speed of the execution can be controlled by the positioning of a scrollbar 128. The selected speed is indicted in a subwindow 130. Since the actual speed is dependent upon a number of factors, the value in the subwindow 130 is percentage-based. In the illustration of FIG. 8, the execution is set to a maximum available speed, i.e., 100%.

As an alternative to the continuous mode, the program execution may be set to a step-by-step mode by depressing a "Step" button 132. This step-by-step mode of operation allows a user to control the execution during program steps of particular interest to the user. For example, a sequence of events that is of particular concern may be slowed to the step-by-step execution of events, while fully tested portions of the program may be run at 100% in a continuous mode. The dynamic visualization of the third screen window 48 may be initiated using a "Trace" button 134 and may be terminated using a "Quit" button 136.

Only a portion of the graph is shown in the third screen window 48. A vertically manipulable scrollbar 138 allows a user to move the graph upwardly and downwardly to selected regions. However, the preferred embodiment enables adjustment of the graph to fit the size of the window, so that the entire graph may be viewed.

The default visualization of the computer program of interest is the two-dimensional graph of FIG. 8. Preferably, a block diagram visualization and a three-dimensional, self-adjusting representation of the computer program are available in the graphical user interface. The block diagram can be selected by designating a "Blocks" region 140 using a computer mouse or trackball. The three-dimensional representation may be selected by designating a "3D" region 142 using the same technique.

A further assistance to a programmer or debugger of the computer program is the ability to cause the source code of the active nodes of the graph to be shown dynamically during the execution of the program. That is, the active traces and the relevant source code may be presented simultaneously within the third screen window 48. By designating a "Source" region 144, the active source code will be presented.

As previously noted, the system 10 of FIG. 1 preferably includes a recorder 42 that enables a tracking mode for recording the sequences of events that are executed during the run-time of the computer program 14. A user can trigger the tracking mode by designating the "Trail" region 146 in FIG. 8. The event recorder supports playback, rewind and fast-forward direct access to any recorded event and supports partial execution between two events. The event recorder shows a textual representation of the events as well as a two-dimensional graph which is identical to the graph of FIG. 8.

A "Colors" region 148 may be designated to enable and disable color differentiation. In the default position, the three initial traces 118, 120 and 122 are different colors in order to allow a user to easily distinguish the three execution threads. Each trace within a sequence that forms an execution thread has a color that is consistent with the thread, but the different threads are easily distinguished. The particular colors depend upon the capabilities of the monitor, as well as the user preferences. However, this default condition can be deselected by designating the "Colors" region 148. Optionally, other techniques may be used to distinguish the threads from each other, such as using differences in line thicknesses or by using dashed, dotted and solid lines for different threads.

The visualization is not restricted to a single run of the program. Any number of runs of the same or different programs can be shown simultaneously, because the system 10 of FIG. 1 administers a unique name space for all the nodes in order to avoid name collisions.

The interaction and cooperation between the visualizer 38 and the program 14 of interest will be described with reference to FIGS. 9–13. In a first exchange 150, a subgraph event is initialized. A graph that represents the program 14 may comprise a number of subgraphs. Subgraphs can be removed entirely or partially from the screen at the request of a user. Moreover, subgraphs can be brought back at any time, whether the underlying user program is running or not.

A subgraph is downloaded at the first occurrence of a thread that executes the subgraph. The visualizer 38 acknowledges the event by returning a subgraph identifier, as represented by exchange 152. The procedures associated with exchanges 150 and 152 will be described in greater detail with reference to FIGS. 10 and 11.

Another exchange 154 between the program 14 and the visualizer 38 is required in order to enter a block event. A block is defined in many structured languages as a group of statements enclosed within braces (e.g., C, C++, and Java) or keywords (e.g., Pascal and Basic). Entering a block corresponds to a fork in a subgraph tree of the program 14. This event can be signaled to the visualizer 38 when the identifiers for the current block, thread and subgraph have been obtained. Each block has an identifier which was generated during the parsing cycle. In exchange 156, an acknowledge event message is transmitted from the visualizer to the processor for executing the program 14.

In exchange 158, the current thread sends an event "Execute Line" to the visualizer 38. An execute line event is generated every time a thread reaches a new line of source code. In exchange 160, the visualizer acknowledges the event.

An "Exit Block Event" exchange 162 is generated every time a thread leaves a block. An event acknowledgment exchange 164 is initiated in response to the exchange 162, and a semaphore that was used to control concurrency is unlocked, as will be explained more fully below. The exchanges 150–164 are implemented as dictated by the program 14 and the configuration selected by the user.

Figure 10:
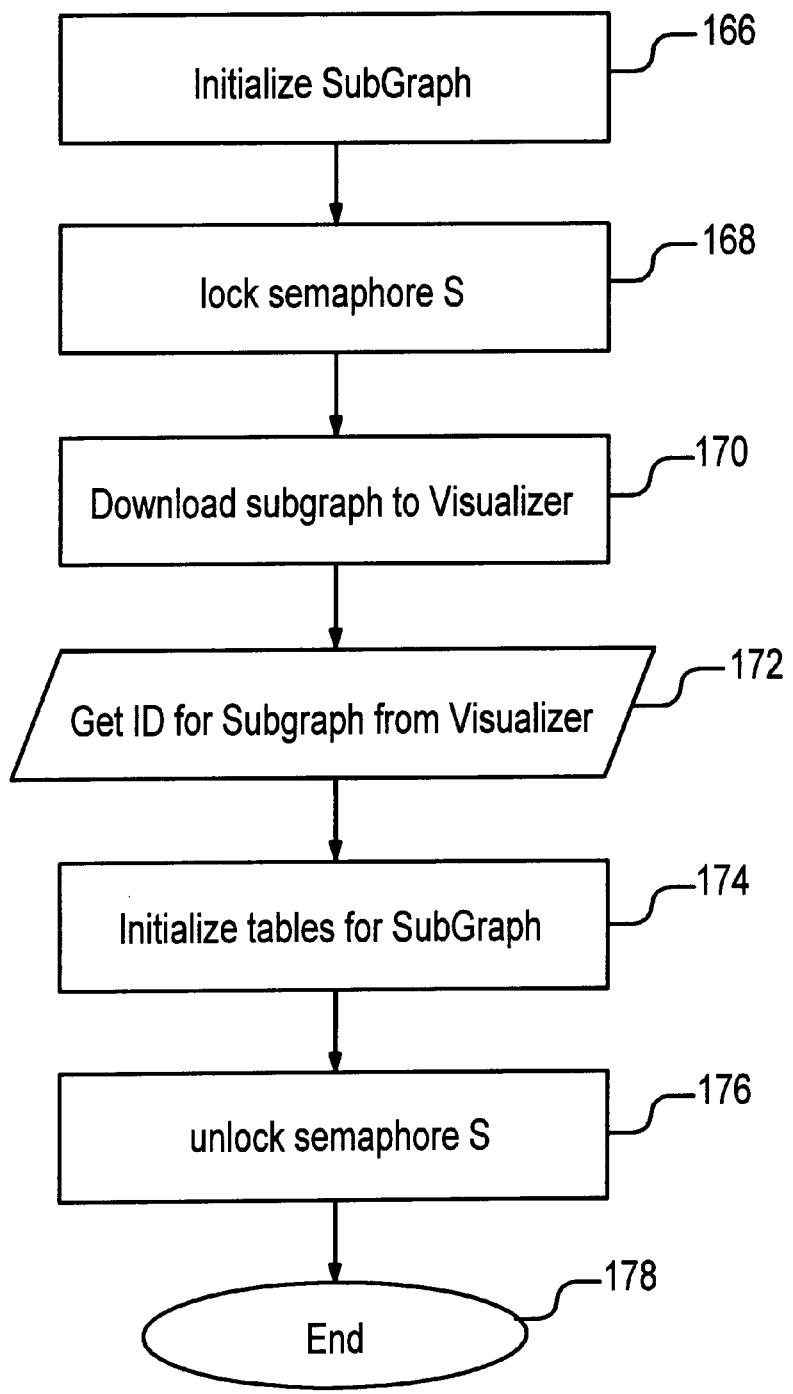
FIG. 10 is a process flow of steps for the "Initialize Subgraph" event of FIG. 9.

Referring now to FIG. 10, the steps associated with initializing a subgraph are shown. In step 166, the subgraph event is initialized. As noted in referring to FIGS. 4–8, threads execute simultaneously. Therefore, a semaphore is used to prevent messages from being mishandled or corrupted when two messages are transmitted to the visualizer 38 by simultaneously executing threads. Thus, in step 168, the semaphore is used as a lock. Semaphores are conventionally used in the art to prevent other threads from corrupting a particular message.

In step 170, the subgraph is downloaded to the visualizer 38. The first time that the subgraph is traversed by a thread, its local structures are uninitialized. This event is clocked and sent to the visualizer. The parameter of this event is the Subgraph.

Figure 9:
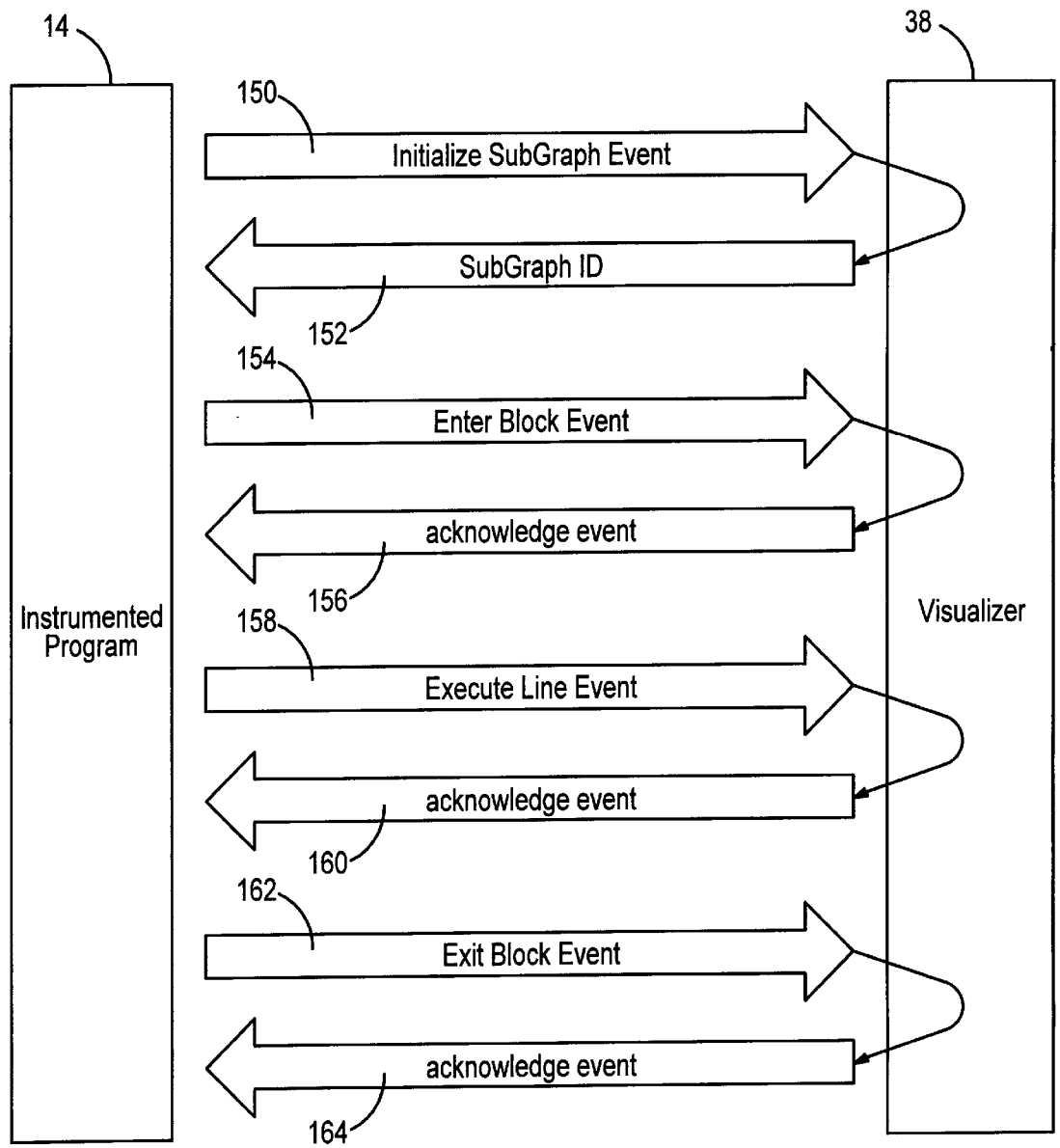
FIG. 9 is a schematic representation of exchanges between the visualizer of FIG. 1 and the program of interest.

In step 172, the visualizer 38 acknowledges the event by returning an identifier for the current subgraph. In FIG. 9, the acknowledgment is sent in the exchange 156. This identifier will be used subsequently to uniquely identify the current subgraph and the nodes of the subgraph. Then, in step 174, the tables that correspond to the current subgraph are reset. The semaphore that was acquired in step 168 is released in step 176 and the process of initializing the subgraph is ended at step 178.

Figure 11:
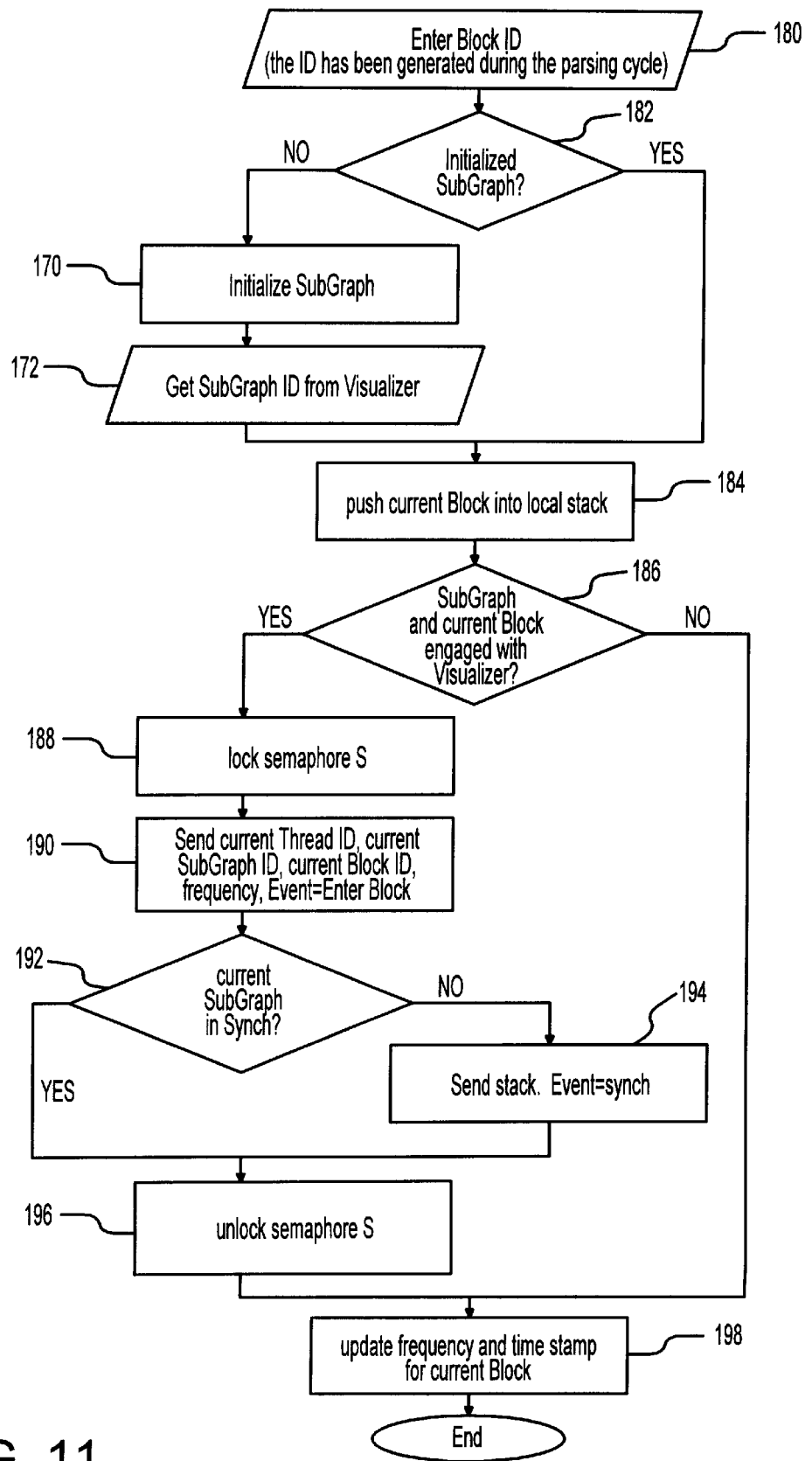
FIG. 11 is a process flow of steps for the "Enter Block" event of FIG. 9.

The enter block event will be described with reference to FIGS. 9 and 11. In step 180, the block identifier is entered. The identifier is the one that was generated during the parsing cycle. In decision step 182, the determination is made as to whether the subgraph to which the block is a component has been initialized. If the Subgraph is uninitialized, the process steps of FIG. 10 are executed. In FIG. 11, the process of FIG. 10 is represented by only two of the steps 170 and 172.

The first time that a subgraph is executed, the data structures in the visualizer 38 and the local program 14 need to be initialized. The initialization of the data structure corresponding to a graph is executed the first time that a subgraph is executed. This event is trapped at the entering of a block. Modern programs are defined as the recursive enclosing of blocks, where a whole a program is a block in itself. Once the local structures for the subgraph have been initialized and the unique identifier has been acquired from the visualizer, the current block is pushed into the local stack, as shown in step 184. That is, the structure allows individual nodes or parts of the subgraph to be engaged and disengaged by the user. Upon engaging a previously disengaged part of the subgraph, the part is out of synch with the visualizer 38. The stack allows the program 14 and the visualizer 38 to return to synchronization.

In the decision step 186, it is determined whether the subgraph and the current block are engaged with the visualizer 38. As previously noted, the visualizer allows users to disengage individual nodes, parts of a subgraph, whole subgraphs, or whole programs. This has the effect of minimizing the overhead that the visualizer imposes on a running program. If a node or part of a subgraph is disengaged, events belonging to the disengaged node or part are not sent to the visualizer 38. Assuming that there is a positive response at the decision step 186, a step 188 of locking a semaphore is executed. As noted with regard to step 168 in FIG. 10, semaphores are used to prevent messages of simultaneously executing threads from being corrupted. After a lock to the semaphore has been obtained in order to bar other threads from corrupting network messages, the current thread sends the "Enter Block" message to the visualizer 38. The parameters of this event are (1) the identifier of the current thread, (2) the identifier of the current subgraph, (3) the identifier of the current block, and (4) the frequency of utilization of the current block. This is shown at step 190.

With the information that is acquired in step 190, the visualizer 38 can update the display of the subgraph with precision. At decision step 192, a determination is made as to whether the current thread is out of synch with the visualizer as a result of a previous disengagement. If there is no synchronization, an event "Synch" is sent to the visualizer, as shown at step 194. The parameter of the "Synch" event is the contents of the stack. The "Synch" event allows the visualizer to properly display the current traversal and location of a thread in the current subgraph.

If in determination step 192 a positive response is returned, the semaphore that was acquired in step 188 is released in step 196. Then, in step 198, another local structure records the frequency and the time stamp corresponding to the current block. The frequency is a count of the number of times that the current block has been traversed by a thread. The time stamp records the clock. When the current thread exits the current block in an "Exit Block" event, the time stamp at the time of the exit will be subtracted from the current time, thereby providing an approximate indication of the temperature of the current block. The "temperature" is defined herein as the time that the central processing unit (CPU) has spent in the current block.

Figure 12:
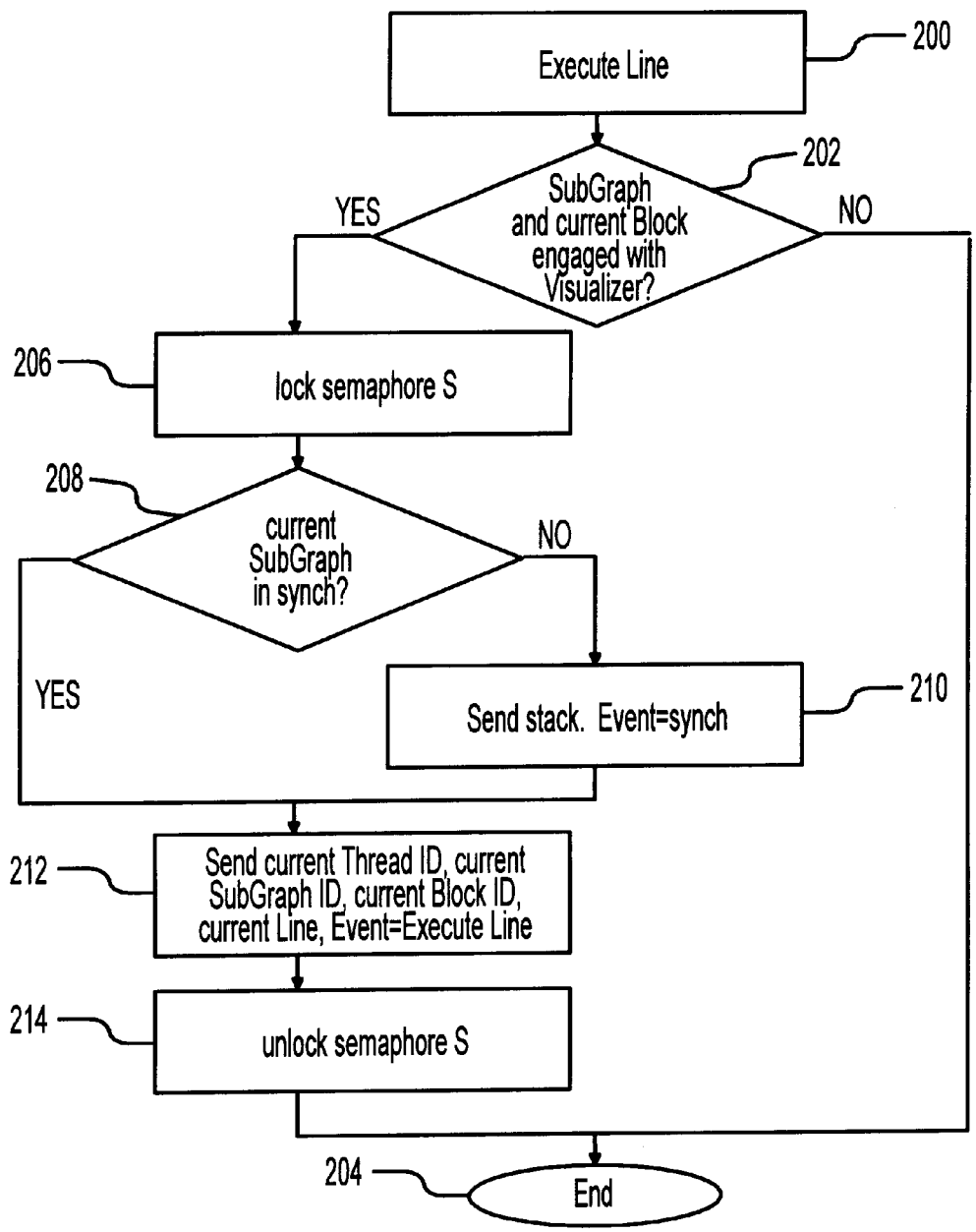
FIG. 12 is a process flow of steps for the "Execute Line" event of FIG. 9.

An "Execute Line" event will be described with reference to FIGS. 9 and 12. The steps 200 and 202 of executing the line and determining whether the subgraph and current block are engaged with the visualizer 38 are substantially identical to the steps 184 and 186 described with reference to FIG. 11. If a negative response is generated at the decision step 202, no event will be sent to the visualizer and the current thread will proceed to termination step 204. On the other hand, if a positive response is generated at decision step 202, a semaphore is locked at step 206 and a decision step 208 is implemented in order to determine whether the current subgraph is in synch. If a negative response is generated, the step 210 of sending a "Synch" event is identical to the step 194 of FIG. 11. However, a positive result triggers a step 212 of sending an "Execute Line" event to the visualizer 38. The parameters of this event are (1) the identifier of the current thread, (2) the identifier of the current subgraph, (3) the identifier of the current block, and (4) the line number. With this information, the visualizer can update the display with precision. Once the message has been sent and the visualizer has acknowledged the event, the semaphore acquired in step 206 is unlocked, as indicated by step 214.

Figure 13:
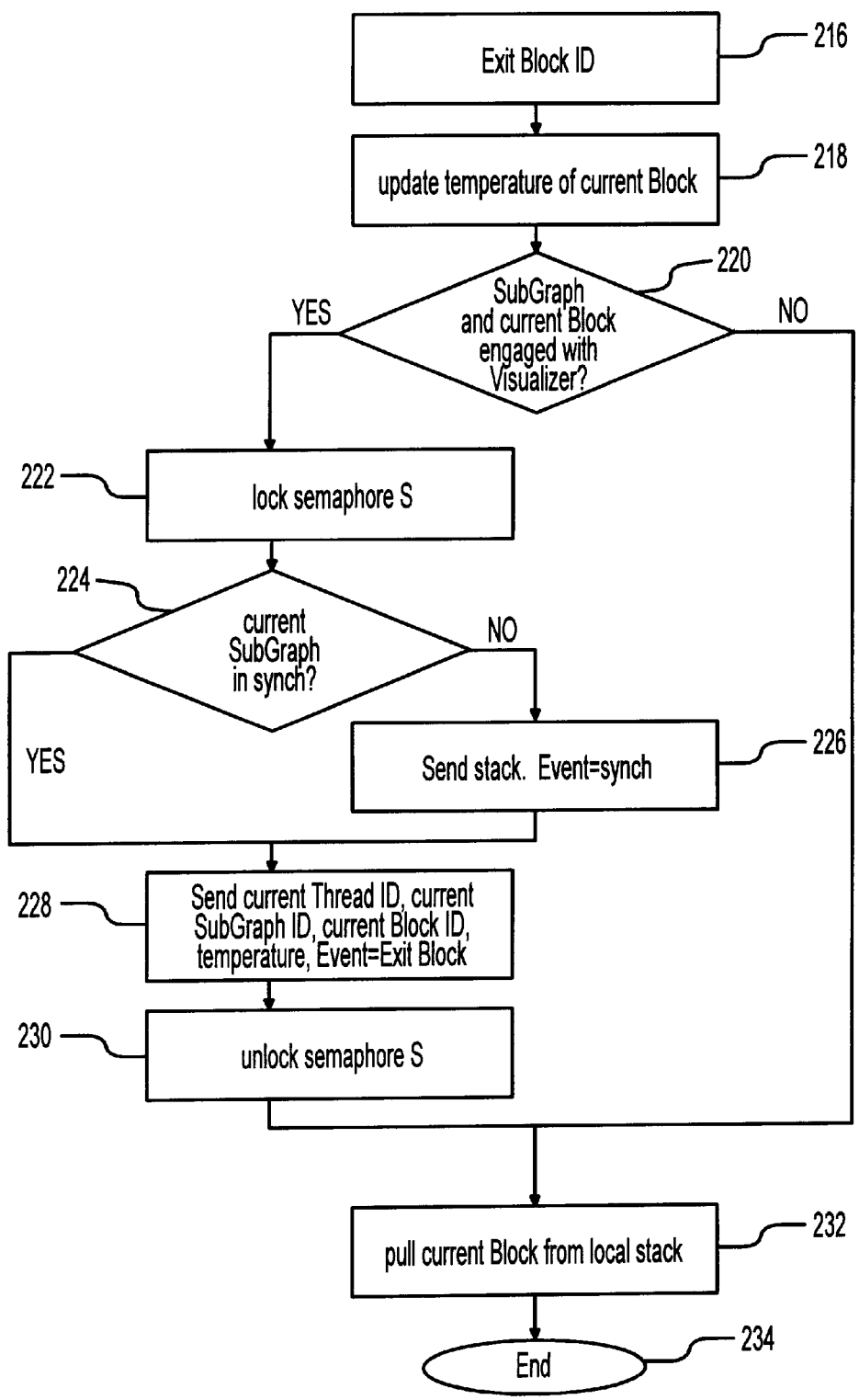
FIG. 13 is a process flow of steps for the "Exit Block" event of FIG. 9.

The process of exiting a block will be described with reference to FIGS. 9 and 13. In step 216, the identifier of the block to be exited is provided. In the execution of step 218, the difference between the time stamp recorded when the current thread exited the "Enter Block" event at step 198 of FIG. 11 and the current time stamp is recorded. This difference, which is independent from the time spent updating the display by the visualizer 38, is added to a local structure. The temperature of the current node is sent to the visualizer as a parameter of a later step 228 of providing information to the visualizer 38.

In decision step 220, there is a determination as to whether the subgraph and the current block are engaged with the visualizer 38. If one or both are not engaged, no event will be sent to the visualizer and the current thread will proceed to the step 232 of pulling the current block from the current stack.

An affirmative response at step 220 causes a semaphore to be acquired at step 222. This is similar to the semaphores described above, which prevent other threads from corrupting the current message to the visualizer 38.

In step 224, the determination is made as to whether the current subgraph is in synchronization. If not, a "Synch" event is sent at step 226. Once synchronization is assured, the current thread sends an "Exit Block" event to the visualizer 38 at step 228. The parameters of this event are (1) the identifier of the current thread, (2) the identifier of the current subgraph, (3) the identifier of the current block, and (4) the temperature of the current block. The information is used to precisely update the display. Once the message has been sent and the visualizer has acknowledged the event, the semaphore is released at step 230. The local data structure tracking the call stack is then updated at step 232 and the process ends in step 234.

What is claimed is:

1. A method of identifying operations of a computer program comprising steps of:
   generating a representation of said computer program such that said representation includes nodes associated with events executable via said computer program;
   initiating said computer program to establish a run-time for execution of said events;
   forming a visual display of said representation during said run-time;
   monitoring said executions of said events during said run-time; and manipulating said visual display during said run-time, including identifying said nodes at run-time in response to said executions, thereby visually indicating each execution of each said event by identifying said nodes with which said events are associated.

2. The method of claim 1 wherein said step of manipulating said visual display includes forming execution threads on said representation such that said execution threads link nodes associated with sequentially occurring events and are formed in response to execution of said computer program.

3. The method of claim 2 wherein said step of generating said representation includes generating a graph from source code of said computer program, said events including executable methods.

4. The method of claim 2 wherein said step of forming execution threads includes displaying a trace of an execution thread for each subsequent event that logically follows a preceding event in execution of said computer program, said trace being a visual link from a first node associated with said preceding event to a second node associated with said subsequent event.

5. The method of claim 2 further comprising a step of enabling a selection between (a) limiting display of execution threads to threads that are presently active in the execution of said computer program and (b) retaining the displays of said execution threads following completions of executions of logical sequences of said events such that said execution threads remain displayed when inactive.

6. The method of claim 1 further comprising a step of enabling a selection within a range of execution speeds of said computer program, including a step-by-step execution speed and a plurality of intermediate execution speeds.

7. The method of claim 6 further comprising steps of enabling selection of breakpoints for suspending said executions of said events upon occurrence of a selectable event and selectively resuming suspended executions of said events.

8. The method of claim 1 further comprising a step of adding stubs to source code of said computer program such that said stubs enable said step of monitoring said executions of said events, said stubs being inserted at locations corresponding to lines relating to said executions of said events, said step of monitoring said executions including recognizing and processing said stubs.

9. The method of claim 1 further comprising a step of forming a static visualization of a structure of said computer program, including enclosing each block of source code in a frame and including forming a designation on each said frame that encloses a block which is a loop.

10. The method of claim 9 wherein said step of forming said static visualization further includes visually distinguishing internal calls from external calls.

11. The method of claim 2 further comprising a step of setting a particular node such that an independent second program is launched as an automatic response to execution of a thread of said particular node.

12. A system for identifying operations of a computer program at run-time comprising:

graphing means for generating a graph that is representative of said computer program, said graphing means being responsive to identification of blocks of code in said computer program such that said graph includes an arrangement of nodes indicative of said blocks;

monitor means for monitoring operations of said computer program at run-time to recognize accesses to said blocks during said run-time of said computer program;

a display for visually presenting said graph during said run-time; and indicator means, responsive to said monitor means, for manipulating said display to visually link nodes of said graph in response to said accesses to said blocks, said manipulating occurring during said run-time and being indicative of a sequence of said accesses.

13. The system of claim 12 wherein said display includes video circuitry and said indicator means is connected to said video circuitry to generate traces in a pattern to visually link said nodes in accordance with said sequence of accesses of said blocks.

14. The system of claim 13 further comprising memory connected to said monitor means for recording selected portions of said accesses to said blocks.

15. The system of claim 12 wherein said monitor means is enabled to simultaneously recognize sequences of accesses to blocks for a plurality of runs of computer programs, thereby providing visual links of said sequences of said accesses for a plurality of simultaneous runs of computer programs.

16. A method of visualizing structure of a computer program comprising steps of:

accessing source code of said computer program;

identifying blocks within said source code;

forming a graph of said computer program based upon said blocks, including organizing said graph as a static arrangement of nodes such that at least some of said nodes represent said blocks;

displaying said graph as said static arrangement of nodes;

executing said computer program while said graph is displayed; and dynamically displaying threads of execution in running said computer program, including indicating active nodes of said graph a run-time such that sequences of node access are graphically displayed during running of said computer program.

17. The method of claim 16 wherein said step of dynamically displaying said threads includes forming traces between nodes such that each said sequence is graphically displayed as a plurality of said traces.

18. The method of claim 17 wherein said step of dynamically displaying said threads includes retaining display of said threads only while said threads are active.

19. The method of claim 17 wherein said step of dynamically displaying said threads includes enabling a selection of consistently retaining display of said threads after said threads are active.

20. The method of claim 17 further comprising a step of recording said sequence to enable a playback of said step of dynamically displaying said threads.

21. The method of claim 17 further comprising a step of enabling a selection of execution speeds during said running of said computer program.

22. The method of claim 16 further comprising a step of enabling said steps of displaying and forming said graph to generate events of said computer program, thereby providing interactivity between said computer program and steps of visualizing said computer program.

* * * * *